United States Patent
Chen

(10) Patent No.: US 9,177,176 B2
(45) Date of Patent: Nov. 3, 2015

(54) METHOD AND SYSTEM FOR SECURE SYSTEM-ON-A-CHIP ARCHITECTURE FOR MULTIMEDIA DATA PROCESSING

(75) Inventor: Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1119 days.

(21) Appl. No.: 11/362,696

(22) Filed: Feb. 27, 2006

(65) Prior Publication Data

US 2007/0209072 A1  Sep. 6, 2007

(51) Int. Cl.
| | |
|---|---|
| G06F 21/00 | (2013.01) |
| G06F 21/78 | (2013.01) |
| G06F 12/14 | (2006.01) |
| G06F 21/10 | (2013.01) |

(52) U.S. Cl.
CPC ............ *G06F 21/78* (2013.01); *G06F 12/1433* (2013.01); *G06F 21/10* (2013.01)

(58) Field of Classification Search
CPC ........................................................ G06F 21/10
USPC ...................................... 726/16, 34, 1; 380/4
See application file for complete search history.

(56) References Cited

U.S. PATENT DOCUMENTS

| | | | |
|---|---|---|---|
| 5,014,191 A | | 5/1991 | Padgaonkar et al. |
| 5,206,714 A | * | 4/1993 | Kim ............... 348/565 |
| 5,319,705 A | * | 6/1994 | Halter et al. ............ 705/54 |
| 5,557,743 A | | 9/1996 | Pombo et al. |
| 5,623,637 A | | 4/1997 | Jones et al. |
| 5,832,207 A | | 11/1998 | Little et al. |
| 6,028,937 A | | 2/2000 | Tatebayashi et al. |
| 6,038,563 A | | 3/2000 | Bapat et al. |
| 6,182,089 B1 | | 1/2001 | Ganapathy et al. |
| 6,279,063 B1 | | 8/2001 | Kawasaki et al. |
| 6,381,747 B1 | | 4/2002 | Wonfor et al. |

(Continued)

FOREIGN PATENT DOCUMENTS

| | | |
|---|---|---|
| EP | 1612684 A1 | 1/2006 |
| EP | 1612684 B1 | 9/2009 |

(Continued)

OTHER PUBLICATIONS

Extended European Search Report corresponding to European Patent Application Serial No. 06021663.7-2212, dated Dec. 16, 2008.

(Continued)

*Primary Examiner* — Morshed Mehedi
(74) *Attorney, Agent, or Firm* — Sterne, Kessler, Goldstein & Fox PLLC

(57) ABSTRACT

Aspects of a method and apparatus for a secure system-on-a-chip (SOC) architecture for multimedia data processing are provided. A processor may configure at least one subsystem within the SOC via at least one unsecured bus while a security processor enables secure functionalities in configured subsystems via at least one secure bus. The unsecure buses may comprise a data bus and/or a control bus, for example. The secure buses may comprise a secure control bus and/or a secure key bus, for example. The configurable subsystems may be multimedia processing units, input and output modules, and/or memory controllers. The security processor may program bits in security registers within the subsystems to enable secure functionalities, such as data routing paths and/or key loading paths, for example. Moreover, the security processor may validate code to be executed by a processor for configuring the SOC subsystems.

21 Claims, 9 Drawing Sheets

(56) References Cited

U.S. PATENT DOCUMENTS

| | | | |
|---|---|---|---|
| 6,466,048 B1 * | 10/2002 | Goodman | 326/8 |
| 6,586,968 B1 | 7/2003 | Schauer et al. | |
| 6,785,721 B1 | 8/2004 | Immerman et al. | |
| 6,850,252 B1 | 2/2005 | Hoffberg | |
| 6,880,005 B1 | 4/2005 | Bell et al. | |
| 6,880,113 B2 | 4/2005 | Anderson et al. | |
| 6,948,183 B1 | 9/2005 | Peterka | |
| 6,950,818 B2 | 9/2005 | Dennis et al. | |
| 6,970,462 B1 | 11/2005 | McRae | |
| 7,147,558 B2 | 12/2006 | Giobbi | |
| 7,167,077 B2 * | 1/2007 | Grassl | 340/5.61 |
| 7,176,791 B2 | 2/2007 | Sakaki et al. | |
| 7,227,842 B1 | 6/2007 | Ji et al. | |
| 7,236,493 B1 | 6/2007 | McRae | |
| 7,263,367 B1 | 8/2007 | Sabot | |
| 7,317,723 B1 | 1/2008 | Guru | |
| 7,340,469 B1 | 3/2008 | Alghathbar et al. | |
| 7,350,204 B2 | 3/2008 | Lambert et al. | |
| 7,409,707 B2 | 8/2008 | Swander et al. | |
| 7,484,237 B2 | 1/2009 | Joly et al. | |
| 7,487,424 B2 | 2/2009 | Nam et al. | |
| 7,489,779 B2 * | 2/2009 | Scheuermann | 380/28 |
| 7,490,333 B2 | 2/2009 | Grimaud et al. | |
| 7,507,653 B2 | 3/2009 | Lin et al. | |
| 7,518,605 B2 | 4/2009 | Lin et al. | |
| 7,549,159 B2 | 6/2009 | Shay | |
| 7,565,553 B2 | 7/2009 | Hunter et al. | |
| 7,590,860 B2 | 9/2009 | Leporini et al. | |
| 7,624,424 B2 | 11/2009 | Morita et al. | |
| 7,647,329 B1 | 1/2010 | Fischman et al. | |
| 7,844,996 B2 | 11/2010 | Chen et al. | |
| 7,913,289 B2 | 3/2011 | Chen et al. | |
| 8,347,357 B2 | 1/2013 | Chen et al. | |
| 2002/0059623 A1 | 5/2002 | Rodriguez et al. | |
| 2002/0099952 A1 | 7/2002 | Lambert et al. | |
| 2002/0138749 A1 | 9/2002 | Koguchi et al. | |
| 2003/0041267 A1 | 2/2003 | Fee et al. | |
| 2003/0065982 A1 | 4/2003 | Grimaud et al. | |
| 2003/0070091 A1 | 4/2003 | Loveland | |
| 2003/0081784 A1 | 5/2003 | Kallahalla et al. | |
| 2003/0088786 A1 | 5/2003 | Moran et al. | |
| 2003/0115417 A1 | 6/2003 | Corrigan | |
| 2003/0140245 A1 | 7/2003 | Dahan et al. | |
| 2003/0217322 A1 | 11/2003 | Rodgers | |
| 2003/0221030 A1 | 11/2003 | Pontius et al. | |
| 2003/0226029 A1 | 12/2003 | Porter et al. | |
| 2004/0086127 A1 | 5/2004 | Candelore | |
| 2004/0088558 A1 | 5/2004 | Candelore | |
| 2004/0250131 A1 | 12/2004 | Swander et al. | |
| 2005/0010765 A1 | 1/2005 | Swander et al. | |
| 2005/0021980 A1 | 1/2005 | Kanai | |
| 2005/0022010 A1 | 1/2005 | Swander et al. | |
| 2005/0114616 A1 * | 5/2005 | Tune et al. | 711/163 |
| 2005/0144475 A1 | 6/2005 | Sakaki et al. | |
| 2005/0213766 A1 | 9/2005 | Goss | |
| 2005/0234907 A1 | 10/2005 | Yamagishi et al. | |
| 2005/0262132 A1 | 11/2005 | Morita et al. | |
| 2005/0262569 A1 | 11/2005 | Shay | |
| 2005/0262570 A1 | 11/2005 | Shay | |
| 2005/0268342 A1 | 12/2005 | Shay | |
| 2005/0278483 A1 | 12/2005 | Andruszkiewicz et al. | |
| 2006/0015947 A1 * | 1/2006 | Conti et al. | 726/34 |
| 2006/0031685 A1 | 2/2006 | Chen et al. | |
| 2006/0075508 A1 | 4/2006 | Guo et al. | |
| 2006/0090084 A1 | 4/2006 | Buer | |
| 2006/0149958 A1 | 7/2006 | Omathuna | |
| 2006/0161829 A1 | 7/2006 | Kobayashi | |
| 2006/0236408 A1 | 10/2006 | Van | |
| 2006/0265733 A1 | 11/2006 | Chen et al. | |
| 2006/0265734 A1 | 11/2006 | Chen et al. | |
| 2006/0294575 A1 | 12/2006 | Rogers | |
| 2007/0169173 A1 | 7/2007 | Brown et al. | |
| 2007/0176756 A1 | 8/2007 | Friedrich | |
| 2007/0192839 A1 | 8/2007 | Fee et al. | |
| 2007/0209072 A1 * | 9/2007 | Chen | 726/16 |
| 2007/0294745 A1 | 12/2007 | Tan et al. | |
| 2008/0005586 A1 | 1/2008 | Munguia | |
| 2008/0271164 A1 | 10/2008 | Dellow et al. | |
| 2009/0285280 A1 | 11/2009 | Newberry et al. | |
| 2009/0313461 A1 | 12/2009 | Klug | |
| 2011/0197069 A9 | 8/2011 | Rodgers et al. | |

FOREIGN PATENT DOCUMENTS

| | | |
|---|---|---|
| WO | WO 97/25675 | 7/1997 |
| WO | WO 99/14881 | 3/1999 |

OTHER PUBLICATIONS

European Patent Office Communication pursuant to Article 94(3) EPC, corresponding to European Patent Application Serial No. 06021663.7-2212, dated Mar. 16, 2010.

Federal Information Processing Standards Publication, FIPS PUB 46-3, *Data Encryption Standard (DES)*, Oct. 25, 1999, 25 pages.

Definition of "computer code", from http://www.thefreedictionary.com/computer+code, printed Jul. 1, 2013, 2 pages.

* cited by examiner

420

| Input | Source | Valid guard bit |
|---|---|---|
| KeyIn | Host processor | 1 |
| KeyIn | Security processor | 0 |
| DataIn | Transport input data interface | 0 |
| DataIn | Global memory | 0 |
| ConfigDataIn | Host processor | 0 |
| ConfigDataIn | Security processor | 0 |

Configuration register | Security register

Valid guard bit

0 – Valid
1 - Invalid

FIG. 4B

METHOD AND SYSTEM FOR SECURE SYSTEM-ON-A-CHIP ARCHITECTURE FOR MULTIMEDIA DATA PROCESSING

CROSS-REFERENCE TO RELATED APPLICATIONS/INCORPORATION BY REFERENCE

[Not Applicable]

FIELD OF THE INVENTION

Certain embodiments of the invention relate to processing digital video. More specifically, certain embodiments of the invention relate to a method and system for a secure system-on-a-chip (SOC) architecture for multimedia data processing.

BACKGROUND OF THE INVENTION

In an increasingly security-conscious world, protecting access to information and/or to systems from unwanted discovery and/or corruption is a major issue for both consumers and businesses. Many consumer or business systems may be vulnerable to unwanted access when the level of security provided within the system is not sufficient for providing the appropriate protection. In this regard, consumer systems, such as multimedia systems, for example, may require the use of integrated architectures that enable security management mechanisms for defining and administering user rights or privileges in order to provide the necessary protection from unwanted access.

An example of a multimedia system that may be accessed by many different users may be a set-top box where manufacturers, vendors, operators, and/or home users may have an interest in accessing at least some limited functionality of the system. In some instances, a single device, such as a security processor for example, may be utilized to administer security operations in the multimedia system. The security processor may operate independently of other components in the multimedia system when determining rights or privileges of different users to various features in the multimedia system. For example, vendors may have limited access to some of the functions that may be accessible by the manufacturer. Home users may only have access to a subset of the vendors' access rights. In some instances, secure operations may be managed by specifying, in a single location, secure conditions for each security component supported by the system.

However, there may be several limitations with such a straightforward implementation. On a typical security system, the number of user modes and security components may be sufficiently large that the size of the security management and/or control information may require large amounts of memory. There may be a significant number of access control entries that may correspond to instances when access rights may not be granted and/or instances when the access rights may be the same for multiple user modes and/or for multiple security components, such as default settings, for example. The addition or removal of user modes or security components may pose various implementation challenges, which increases hardware and/or software complexity. As software and/or hardware complexity increases, it may become more challenging to manage security operations without introducing security breaches or other concerns.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a secure system-on-a-chip (SOC) architecture for multimedia data processing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4B is a table illustrating exemplary input configurations for a descrambling block in a secure SOC architecture, in accordance with an embodiment of the invention.

DETAILED DESCRIPTION OF THE INVENTION

Certain embodiments of the invention may be found in a method and system for a secure system-on-a-chip (SOC) architecture for multimedia data processing. A processor may configure at least one subsystem within the SOC via at least one unsecured bus while a security processor enables secure functionalities in configured subsystems via at least one secure bus. The unsecure buses may comprise a data bus and/or a control bus, for example. The secure buses may comprise a secure control bus and/or a secure key bus, for example. The configurable subsystems may be multimedia processing units, input and output modules, and/or memory controllers. The security processor may program bits in security registers within the subsystems to enable secure functionalities, such as data routing paths and/or key loading paths, for example. Moreover, the security processor may validate code to be executed by a processor for configuring the SOC subsystems.

Figure 1:
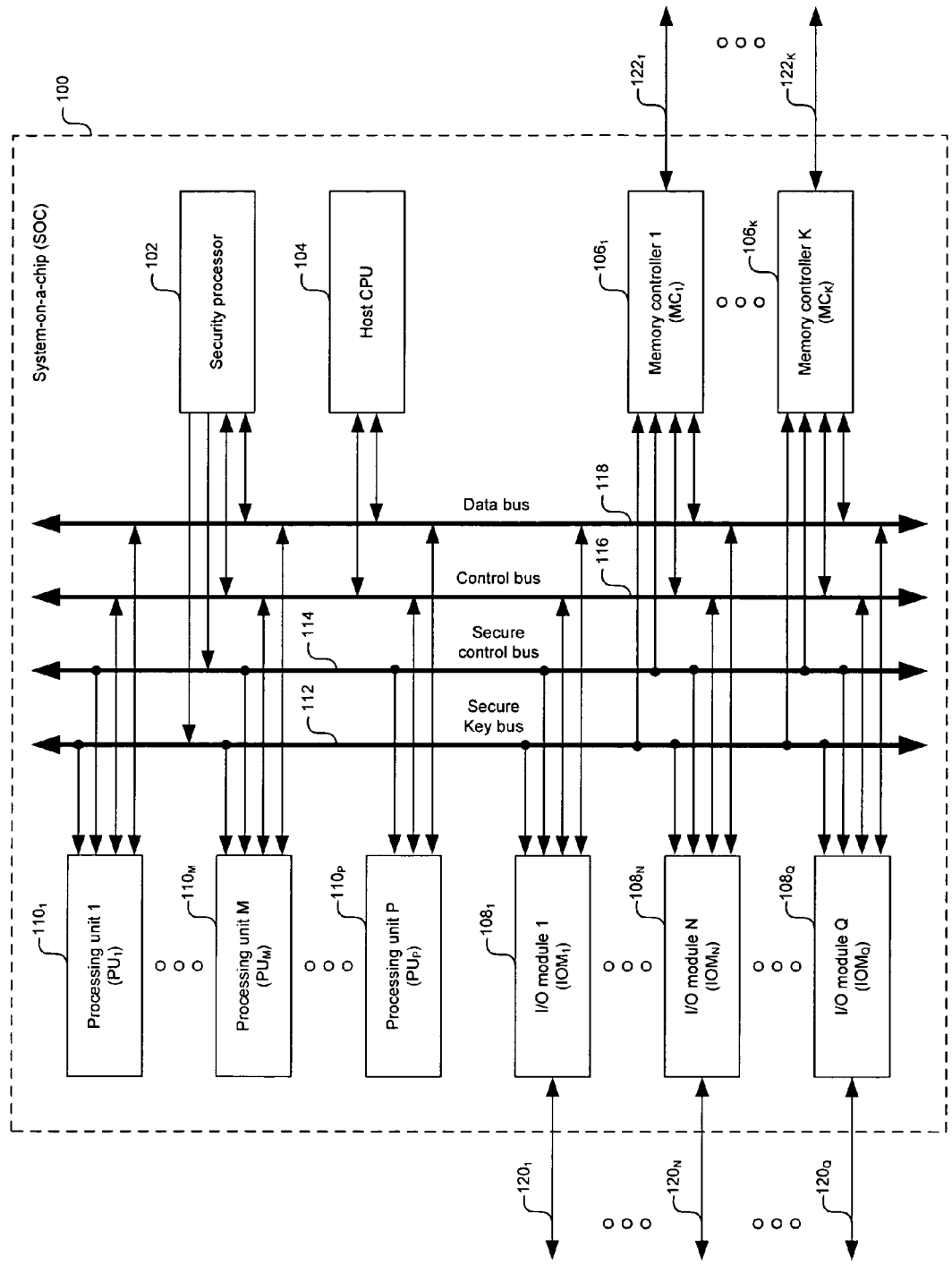
FIG. 1 is a block diagram illustrating an exemplary secure system-on-a-chip (SOC) architecture, in accordance with an embodiment of the invention.

FIG. 1 is a block diagram illustrating an exemplary secure system-on-a-chip (SOC) architecture, in accordance with an embodiment of the invention. Referring to FIG. 1, there is shown an SOC 100 that may be implemented as a single integrated chip, for example. The SOC 100 may comprise at least one memory controller (MC) 106, at least one input/output (I/O) module (IOM) 108, at least one processing unit (PU) 110, a security processor 102, a host processor 104, a secure key bus 112, a secure control bus 114, a control bus 116, and a data bus 118. In the exemplary embodiment described in FIG. 1, the SOC 110 is shown comprising a plurality of processing units $PU_1$ $110_1$, ..., $PU_M$ $110_m$, ..., $PU_P$ $110_P$, a plurality of I/O modules $IOM_1$ $108_1$, ..., $IOM_N$ $108_N$, ..., $IOM_Q$ $108_Q$, and a plurality of memory controllers $MC_1$ $106_1$, ..., $MC_K$ $106_K$. The bus architecture provided by the SOC 100 may enable scalability and may easily support the addition and/or removal of components.

A memory controller 106 may comprise suitable logic, circuitry, and/or code that may enable accessing data from memory and/or storing data to memory. In this regard, the plurality of memory controllers $MC_1$ $106_1$, ..., $MC_K$ $106_K$, described in FIG. 1 may utilize bidirectional interfaces $122_1$, ..., $122_K$, respectively, to communicate with memory. An example of a memory controller 106 may be a 32-bit double data rate (DDR) memory controller. A processing unit 100 may comprise suitable logic, circuitry, and/or code that may enable processing of multimedia data. For example, a PU 110 may be an MPEG video or audio decoder that may be implemented in hardware as an application specific integrated circuit (ASIC) module or in a program as software/firmware executed in an integrated digital signal processor (DSP). An I/O module 108 may comprise suitable logic, circuitry, and/or code that may enable communication with devices external to the SOC 100. In this regard, the plurality of plurality of I/O modules $IOM_1$ $108_1$, ..., $IOM_N$ $108_N$, ..., $IOM_Q$ $108_Q$, described in FIG. 1 may utilize bidirectional interfaces $120_1$, ..., $120_N$, ..., $120_Q$, respectively, to communicate with devices external to the SOC 100. An example of an I/O module 108 may be a universal serial bus (USB) 2.0 interface.

The security processor 102 may comprise suitable logic, circuitry, and/or code that may enable control, configuration, and/or management of security operations and/or functionalities in the SOC 100. In this regard, the security processor 102 may communicate security information to memory controllers, I/O modules, and/or processing units via at least one of the secure key bus 112 and the secure control bus 114. The security processor 102 may also communicate with the host processor 104 via at least one of the control bus 116 and the data bus 118. In some instances, the security processor 102 may be disabled and the SOC 100 may be operated as a multimedia device with minimum security features controlled by the host processor 104.

The processor 104 may comprise suitable logic, circuitry, and/or code that may enable control and/or management of operations in the SOC 100. In this regard, the processor 104 may be utilized for configuring SOC 100 components, such as memory controllers, I/O modules, and/or processing units, for example. The processor 104 may communicate with SOC 100 components via at least one of the control bus 116 and the data bus 118. In this regard, the processor 104 may communicate with the security processor 102 via the control bus 116 and the data bus 118.

The data bus 118 may be utilized for multimedia data transfer between components in the SOC 100. The control bus 116 may be utilized for control and configuration data transfer. For example, the control bus 116 may be utilized to read and/or write to registers. The secure control bus 114 may be utilized for security control and configuration data transfer.

For example, the secure control bus 114 may be utilized to read and/or write to secure registers. In this regard, the secure control bus 114 may be communicatively coupled to components of the SOC 100 that may require secure registers and/or secure data access. The secure key bus 112 may be dedicated for delivering encryption and/or decryption keys to functional units that require keys for cryptographic operations, such as block cipher operations, for example. For example, the processing unit $PU_P$ $100_P$ in FIG. 1 may not utilize encryption and/or decryption keys and need not be connected to the secure key bus 112.

The bus architecture of the SOC 100 need not be limited to the exemplary architecture described in FIG. 1. For example, the secure control bus 114 may be implemented as a secure part or band of the control bus 116. A secure part or band may refer to a portion of the control bus 116 that may be utilized for communicating secure control information, for example. In another example, the functions provided by the data bus 118 may be implemented by a plurality of data buses based on the different types of data being processed in the SOC 100, wherein the plurality of data buses may be connected via bus bridges.

Figure 2A:
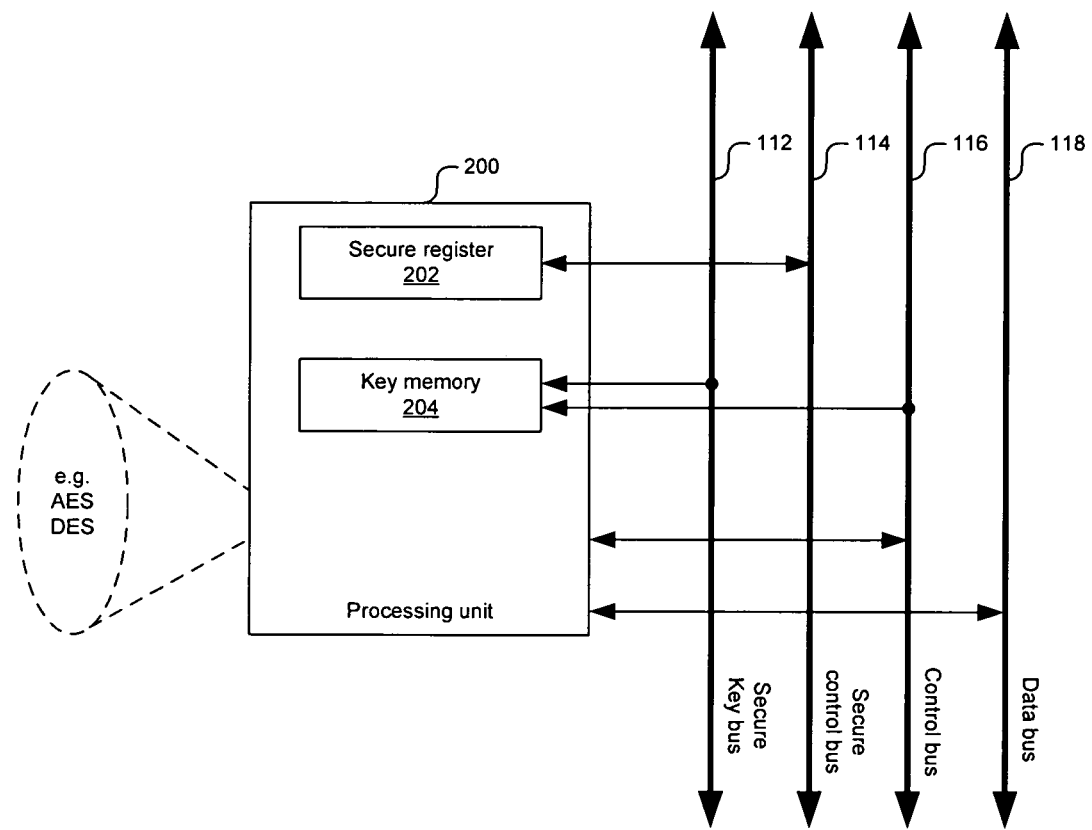
FIG. 2A is a block diagram illustrating an exemplary processing unit in a secure SOC architecture, in accordance with an embodiment of the invention.

FIG. 2A is a block diagram illustrating an exemplary processing unit in a secure SOC architecture, in accordance with an embodiment of the invention. Referring to FIG. 2A, there is shown a processing unit 200 that may comprise a secure register 202 and a key memory 204. The processing unit 200 may comprise suitable logic, circuitry, and/or code that may enable performing multimedia applications that may require encryption and/or decryption operations. The encryption and/or decryption operations may be based on the Data Encryption Standard (DES), the Triple DES or 3DES, and/or the Advanced Encryption Standard (AES), for example. General configuration and/or control information to be utilized and/or generated by the processing unit 200 may be communicated via the control bus 116. Moreover, data to be utilized and/or generated by the processing unit 200 may be communicated via the data bus 118.

The secure register 202 may comprise suitable logic, circuitry, and/or code that may enable communicating information with the security processor 102 via the secure control bus 114. In this regard, the secure register 202 may only be read and/or be written by the security processor 102. The secure register 202 may be implemented as a single register or as set of registers, for example. The secure register 202 may be specified based on its functionalities. For example, at least one bit in the security register 202 may be utilized for enabling and/or disabling control of security functions in the processing unit 200. At least one bit in the security register 202 may be utilized for activating and/or deactivating control of security functions in the processing unit 200. At least one bit in the security register 202 may be utilized for controlling a mode of operation. The mode of operation may indicate an input and/or output data routing, allowing and/or disallowing key loading by the security processor 102 and/or the host processor 104, and/or selection of a security algorithm, for example. The key memory 204 may comprise suitable logic, circuitry, and/or code that may enable storing decryption and/or encryption keys communicated from the security processor 102 via the secure key bus 112 and/or from the host processor 104 via the control bus 116. In this regard, the key memory 204 may be implemented utilizing a write-only random access memory (RAM).

Figure 2B:
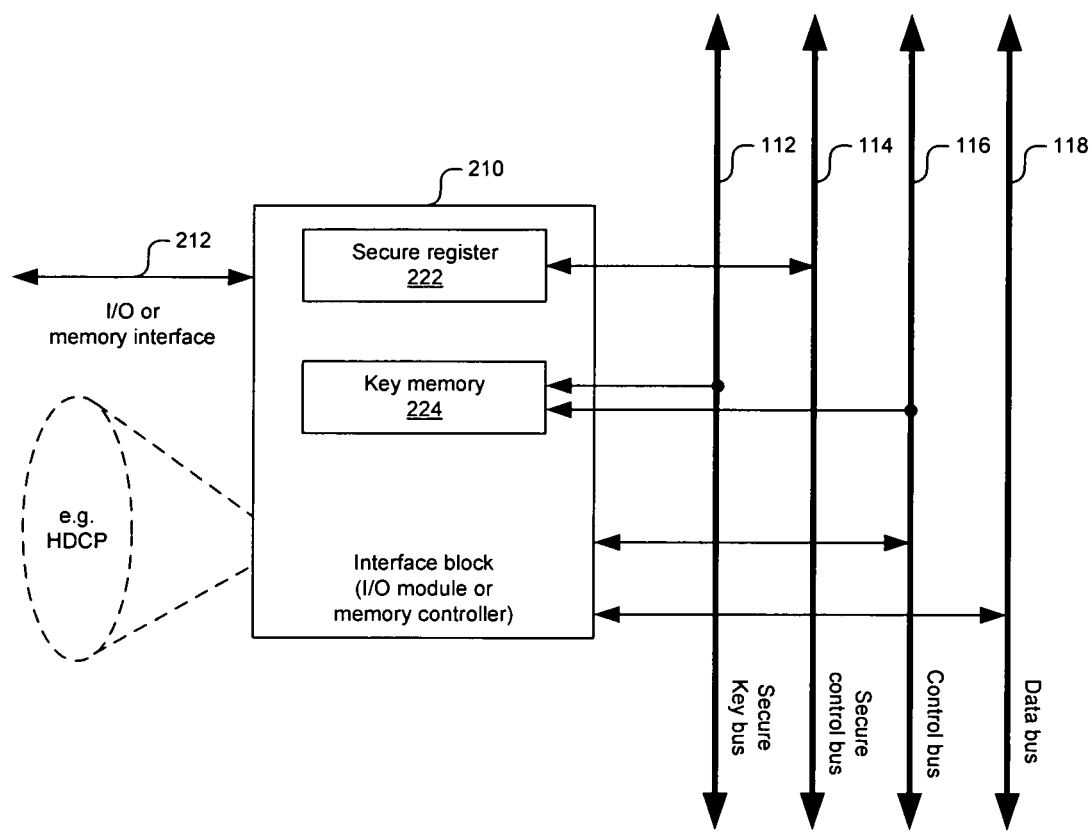
FIG. 2B is a block diagram illustrating an exemplary I/O module or memory controller in a secure SOC architecture, in accordance with an embodiment of the invention.

FIG. 2B is a block diagram illustrating an exemplary I/O module or memory controller in a secure SOC architecture, in accordance with an embodiment of the invention. Referring to FIG. 2B, there is shown an interface block 210 that may comprise a secure register 222 and a key memory 224. The interface block 210 may correspond to an I/O module 108 or a memory controller 106 as described in FIG. 1. The interface block 210 may comprise suitable logic, circuitry, and/or code that may enable communication with devices external to the SOC 100 via the interface 212. In this regard, the interface block 210 may perform secure operations on at least a portion of the communicated data. For example, the interface block 210 may enable high bandwidth digital content protection (HDCP) and may utilize a key protection mechanism for secure interfaces to digital displays, such as digital visual interface (DVI) and high definition multimedia interface (HDMI), for example. General configuration and/or control information to be utilized and/or generated by the interface block 210 may be communicated via the control bus 116. Moreover, data to be utilized and/or generated by the interface block 210 may be communicated via the data bus 118.

The secure register 222 and the key memory 224 in the interface block 210 may be the same as or substantially similar to the secure register 202 and the key memory 204 in FIG. 2A, respectively. For example, the secure register 222 may only be read and/or be written to by the security processor 102, may be implemented as a single register or as set of registers, and may be specified based on its functionalities. The key memory 224, for example, may store decryption and/or encryption keys communicated from the security processor 102 via the secure key bus 112 and/or from the host processor 104 via the control bus 116, and may be implemented utilizing a write-only RAM.

Figure 3:
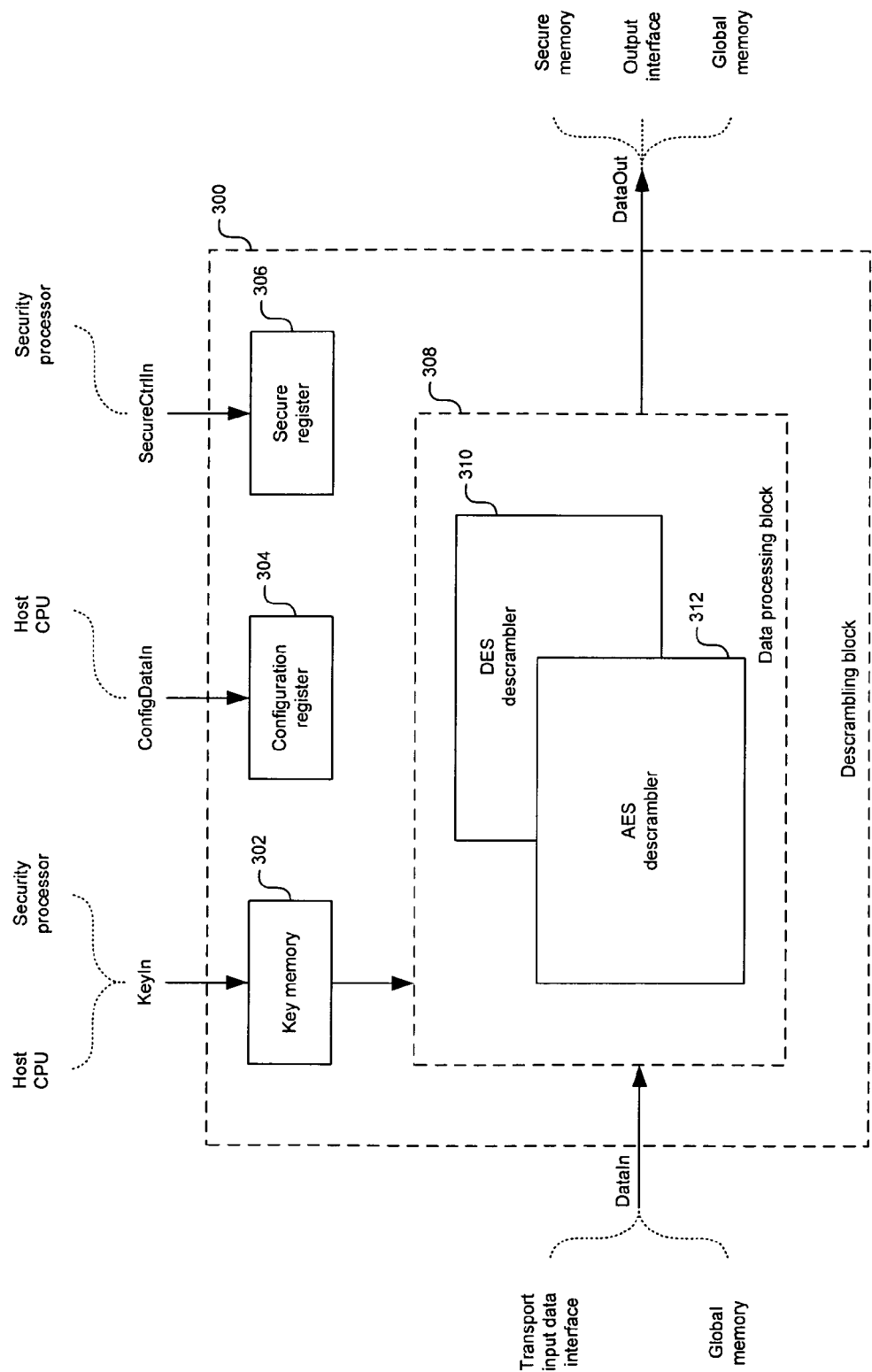
FIG. 3 is a block diagram illustrating an exemplary descrambling block in a secure SOC architecture, in accordance with an embodiment of the invention.

FIG. 3 is a block diagram illustrating an exemplary descrambling block in a secure SOC architecture, in accordance with an embodiment of the invention. Referring to FIG. 3, there is shown a descrambling block 300 that may comprise a data processing block 308, a key memory 302, a configuration register 304, and a secure register 306. In one embodiment of the invention, the data processing block 308 may comprise a DES descrambler 310 and an AES descrambler 312. Other security protocol processor or processing blocks may be utilized without departing from the scope of the invention.

The key memory 302 may be the same or substantially similar to the key memory 204 described in FIG. 2A. Descrambling keys may be loaded onto the key memory 302 from the host processor 104 or from the security processor 102 via a signal, such as a KeyIn signal, for example. Descrambling keys may be received from the host processor 104 via the control bus 116 or from the security processor 102 via the secure key bus 112. The descrambling keys stored in the key memory 302 may be communicated to the data processing block 308. Whether key loading from the host processor 104 or from the security processor 102 is allowed or disallowed may depend on control information provided to the secure register 306.

The secure register 306 may be the same or substantially similar to the secure register 202 described in FIG. 2A. The secure register 306 may receive control information from the security processor 102 via a signal, such as a SecureCntlIn signal, for example. The SecureCntlIn signal may be utilized to enable and/or disable security functions, to activate and/or deactivate security functions, and/or for controlling one or more operating modes in the descrambling block 300. Control information may be received from the security processor 102 via the secure control bus 114. The configuration register 304 may comprise suitable, logic, circuitry, and/or code that may enable storing information that may be utilized for configuring the operations of the descrambling block 300. In this regard, the configuration register 304 may receive configuration information from the host processor 104 via a signal, such as a ConfigDataIn signal, for example.

The data processing block 308 may comprise suitable logic, circuitry, and/or code that may enable descrambling data based on at least one cryptography standard. In the exemplary embodiment described in FIG. 3, the data processing block 308 may support DES and AES, for example. The data processing block 308 may receive input data via a signal, such as a DataIn signal, for example. The data processing block 308 may receive input data from one or more sources, such as a transport input interface and/or from a global memory, for example. The data processing block 308 may transfer output data via a signal, such as a DataOut signal, for example. The data processing block 308 may transfer output data to one or more destinations, such as a secure memory, an output interface, and/or to a global memory.

The DES descrambler 310 may comprise suitable logic, circuitry, and/or code that may enable descrambling data that has been scrambled based on DES. Descrambling keys may be received by the DES descrambler 310 from the key memory 302. The AES descrambler 312 may comprise suitable logic, circuitry, and/or code that may enable descrambling data that has been scrambled based on AES. Descrambling keys may be received by the AES descrambler 312 from the key memory 302.

In operation, the host processor 104 may configure the operation of the descrambling block 300 by writing the appropriate information into the configuration register 304 via the ConfigDataIn signal. In this regard, the configuration information may be utilized to determine input sources and output destinations, that is, data routing paths, for the descrambling block 300. The security processor 102 may enable security functionalities in the descrambling block 300 by writing the appropriate control information into the secure register 306 via the SecureCntlIn signal. In this regard, the security processor 102 may validate the data routing paths configured by the host processor 104, for example. The host processor 104 or the security processor 102 may provide descrambling keys to the key memory 302 via the KeyIn signal. Control information in the secure register 306 may be utilized to determine whether the host processor 104 or the security processor 102 is allowed to load descrambling keys onto the key memory 302. Moreover, control information in the secure register 306 may be utilized to determine whether DES or AES descrambling is to be performed.

Figure 4A:
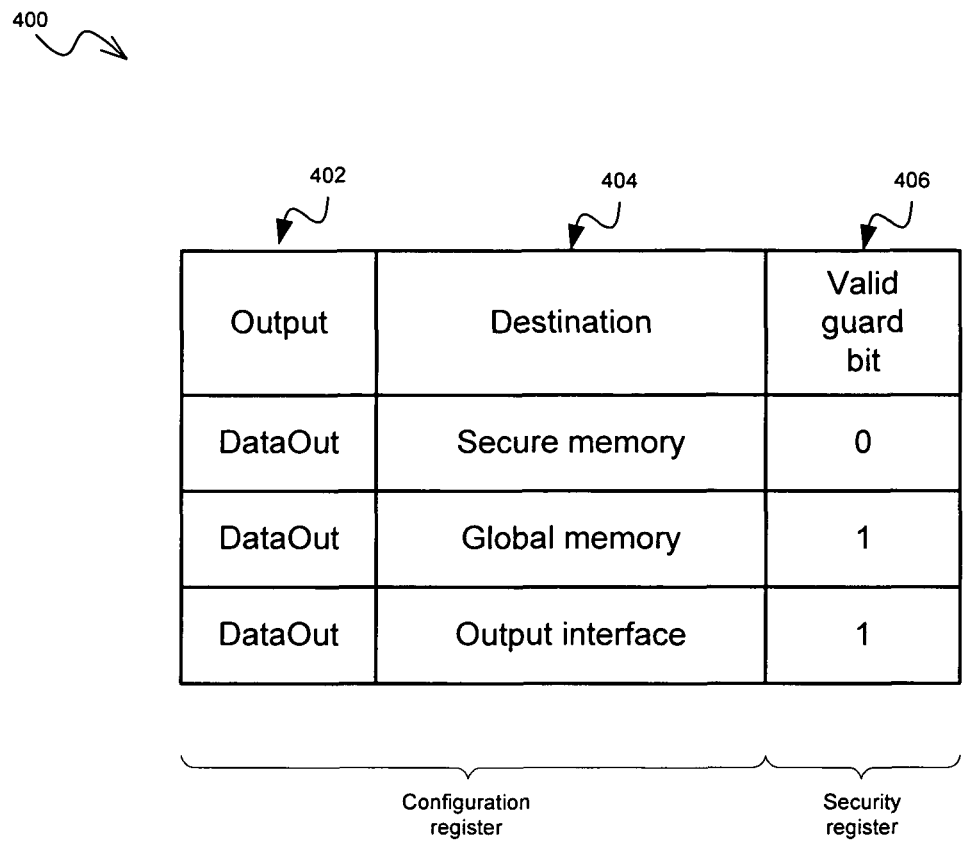
FIG. 4A is a table illustrating exemplary output configurations for a descrambling block in a secure SOC architecture, in accordance with an embodiment of the invention.

FIG. 4A is a table illustrating exemplary output configurations for a descrambling block in a secure SOC architecture, in accordance with an embodiment of the invention. Referring to FIG. 4A, there is shown an output configuration table 400 for the descrambling block 300 in FIG. 3 that comprises an output column 402, a destination column 404, and a valid guard bit column 406. The number of entries in each of the columns corresponds to the output data destinations available to the descrambling block 300. The entries in the output column 402 correspond to the output data signal under consideration, that is, the DataOut signal. The entries in the destination column 404 correspond to the output data destinations available to the DataOut signal, such as, secure memory, global memory, and output interface. The entries in the valid guard bit column 406 correspond to the value of a bit in the secure register 306 that validates or invalidates the destinations in the destination column 404 for the DataOut signal. In this exemplary embodiment, a valid guard bit value of zero validates an output destination, while a valid guard bit value of one invalidates an output destination. In this regard, the secure memory destination is validated as a destination for the descrambled data while the global memory and the output interface destinations are invalidated as destinations of the descrambled data. As a result, only data routing paths that comprise the secure memory as a destination are validated by the control information in the secure register 306.

FIG. 4B is a table illustrating exemplary input configurations for a descrambling block in a secure SOC architecture, in accordance with an embodiment of the invention. Referring to FIG. 4B, there is shown an input configuration table 420 for the descrambling block 300 in FIG. 3 that comprises an input column 422, a source column 424, and a valid guard bit column 426. The entries in the input column 402 correspond to the input data signals under consideration, that is, the KeyIn signal, the DataIn signal, and the ConfigDataIn signal. The entries in the source column 424 correspond to the input data destinations available for each of the input data signals. For example, for the KeyIn and ConfigDataIn signals, the sources may be the host processor 104 or the security processor 102. For the DataIn signal, the sources may be the transport input data interface or the global memory. The entries in the valid guard bit column 426 correspond to the value of a bit in the secure register 306 that validates or invalidates the sources in the source column 424. In this exemplary embodiment, a valid guard bit value of zero validates an output destination, while a valid guard bit value of one invalidates an output destination.

In this exemplary embodiment, for the KeyIn signal, the host processor 104 may be invalidated as a source and the security processor 102 may be validated as a source. In this regard, the key memory 302 may not load descrambling keys from the host processor 104. For the DataIn signal, both the transport input data interface and the global memory are validated as sources of scrambled data. For the ConfigDataIn signal, both the host processor 104 and the security processor 102 are validated as sources of configuration information. As a result, the data routing paths that comprise the global memory or the transport input data interface as sources are validated by the control information in the secure register 306.

Figure 5:
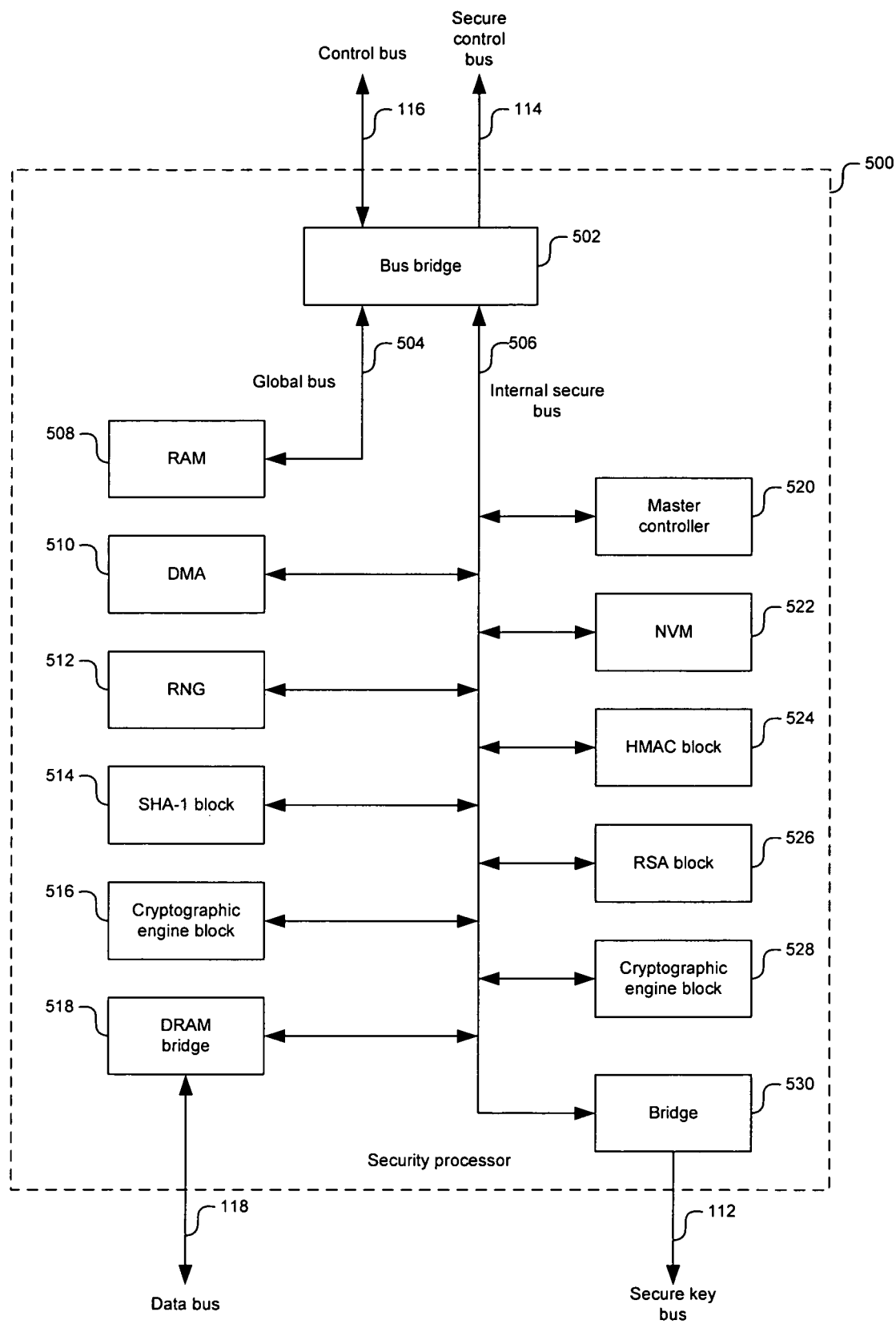
FIG. 5 is a block diagram illustrating an exemplary security processor for use in a secure SOC architecture, in accordance with an embodiment of the invention.

FIG. 5 is a block diagram illustrating an exemplary security processor for use in a secure SOC architecture, in accordance with an embodiment of the invention. Referring to FIG. 5, there is shown a security processor 500 that may comprise a bus bridge 502, a global bus 504, an internal secure bus 506, a RAM 508, a direct memory access (DMA) 510, a random number generator (RNG) 512, a secure hash algorithm 1 (SHA-1) block 514, a cryptographic engine block 516, a DRAM bridge 518, a master controller 520, a non-volatile memory (NVM) 522, a hash function based message authentication code (HMAC) block 524, a RSA block 526, a cryptographic engine block 528, and a bridge 530. The security processor 500 may be the same or substantially similar to the security processor 102 in FIG. 1. In this regard, the security processor 500 may be utilized in a single-chip integrated system such as the SOC 100 in FIG. 1. The security processor 500 may provide required security functions such as, code decryption, certificate processing, key management, challenge and/or response, license handling, and revocation, for example.

The bus bridge 502 may comprise suitable logic, circuitry, and/or code that may enable communication between internal buses, such as the global bus 504 and the internal secure bus 506, in the security processor 500 and external buses such as the control bus 116 and the secure control bus 114. The global bus 504 may communicatively couple the RAM 508 and the bus bridge 502. The internal secure bus 506 may communicatively couple the remaining components in the security processor 500 with the bus bridge 502.

The RAM 508 may comprise suitable logic, circuitry, and/or code that may enable storage of information. For example, the RAM 508 may comprise a portion that stores instructions, or an instruction RAM, another portion that stores data, or data RAM, and a remaining portion or scratch RAM that stores other functions. In some instances, the instruction RAM may be implemented separately and may be stored in a read only memory (ROM), for example.

The master controller 520 may comprise suitable logic, circuitry, and/or code that may enable the security processor 500 to run program code to execute commands received from the host processor 104. The master controller 520 may also accept interrupts via the control bus 116 from processing units, I/O modules, and/or memory controllers in the SOC 100. The master controller 520 may ensure that operations are properly segregated and that shield locations are protected, for example. The NVM 522 may comprise suitable logic, circuitry, and/or code that may enable persistent storage of the identity and state associated with the security processor 500. The NVM 522 may comprise information or items, such as an identity key, and may also be available for allocation and use as authorized by users of the security processor 500.

The HMAC block 524 may comprise suitable logic, circuitry, and/or code that may enable operations that provide proof of knowledge of the authorization data and/or proof that a request arriving is authorized and that no modifications to that request have been made in transit. The RSA block 526 may comprise suitable logic, circuitry, and/or code that may enable public key encryption operations and/or for digital signature operations. The cryptography engine block 516 and 528 may comprise suitable logic, circuitry, and/or code that may enable cryptographic operations on data provided via the internal secure bus 506. The bridge 530 may comprise suitable logic, circuitry, and/or code that may enable communication between the internal secure bus 506 and the secure key bus 112. In this regard, the bridge 530 may enable transfer of encryption and/or decryption key from the security processor 500 to other components or devices.

The DMA 510 may comprise suitable logic, circuitry, and/or code that may enable at least partial control of the internal secure bus 506. The DMA 510 may offload the master controller 520 for transferring large groups of data within the address range of external data memory space of the master controller 520. The DMA 510 may enable access to all internal components or blocks in the security processor 500 via the internal secure bus 506 and all external components in the SOC 100 that are coupled to the control bus 116. Access to the internal secure bus 506 by the DMA 510 and the master controller 520 may be arbitrated. The DMA 510 may assume that the data at the source and the memory space at the destination are both available the master controller 520 enables the DMA transfer. Once a transfer is complete, an interrupt may be generated to the master controller 520. The interrupt may be cleared by, for example, a status read operation or by firmware. In an instance when the DMA 510 is reading from or writing to a FIFO type of data structure, for example, an address auto-increment in the DMA 510 may be disabled.

The DMA 510 may also assist in scheduling the master controller 520 to access the external general non-secure bus, that is, the control bus 116. When the master controller 520 requires access to the control bus 116, to either read or write data, the master controller 520 may program the address of the control bus 116 into an address register in the DMA 510. When the access is a write, the master controller 520 may program the data to be written in a data register in the DMA 510 and may trigger the DMA 510 to perform the appropriate operation for the programmed address. When the request for the DMA 510 register for read/write is completed, a "done" status may be read by the master controller 520, and the master controller 520 is aware that the data is available for "read' or that the "write" operation has been completed.

The RNG 512 may comprise suitable logic, circuitry, and/or code that may enable generation of random values that may be utilized as nonces for key generation in cryptographic operations and/or for randomness in digital signatures, for example. The SHA-1 block 514 may comprise suitable logic, circuitry, and/or code that may enable hash functions associated with the secure hash algorithm 1. The DRAM bridge 512 may comprise suitable logic, circuitry, and/or code that may enable communication between the internal secure bus 506 and the data bus 118.

Communication of information with the security processor 500 may be achieved via the control bus 116, the secure control bus 114, the data bus 118, the secure key bus 112, the bus bridge 502, the DRAM bridge 518, and the bridge 530. These devices and interfaces enable enforcement of the access policies associated with the master controller 520 and the DMA 510 as well as other security functions requiring access control rules of the security processor 500 for each user.

The security processor 500 may support a minimum set of cryptographic algorithms and operations. In the exemplary embodiment described in FIG. 5, the security processor 500 may support RSA, SHA-1, and HMAC. Other implementations may utilize more or fewer cryptographic algorithms and operations as a minimum set, for example. While additional algorithms and protocols may be available to the security processor 500, specifying a minimum set of algorithms may enable require knowledge of the security properties of selected algorithms, and appropriate key sizes, for example, in order to ensure appropriate use of these protocols. Moreover, a minimum set of algorithms may enable definition of a base level of algorithms for interoperability.

Figure 6:
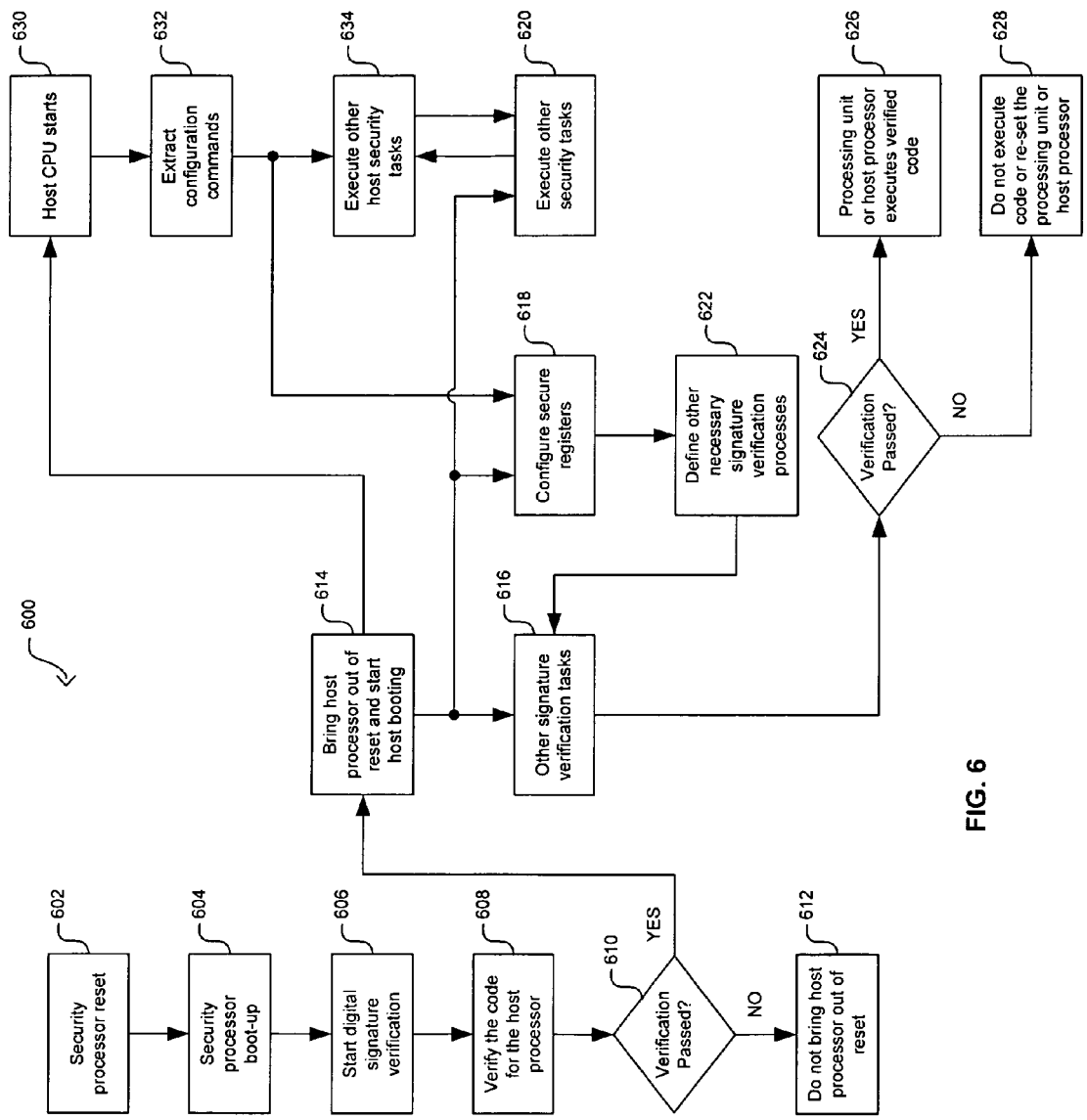
FIG. 6 is a flow diagram illustrating exemplary steps for operation of a secure SOC architecture, in accordance with an embodiment of the invention.

FIG. 6 is a flow diagram illustrating exemplary steps operation of a secure SOC architecture, in accordance with an embodiment of the invention. Referring to FIG. 6, there is shown an exemplary flow diagram 600. In step 602, the security processor 102 in FIG. 1 may be reset. In step 604, the security processor 102 may be brought out of reset to perform boot-up operations. In step 606, the security processor 102 may start digital signature verification operations. In step 608, the security processor 102 may verify the code to be executed by the host processor 104. In step 610, when the code to be executed by the host processor 104 does not pass verification by the security processor 102, the process may proceed to step 612 where the host processor 104 may not be brought out of reset. When the code passes verification by the security processor 102, the process may proceed to step 614 where the host processor 104 may be brought out of reset and may start boot-up operations.

After step 614, the process may proceed to step 630. In step 630, the host processor 104 starts operating after completing booting up. In step 632, the host processor 104 may extract configuration commands that may be utilized to configure the components in the SOC 100, for example. In this regard, each of the processing units, I/O modules, and/or memory controllers in the SOC 100 may have a default configuration that may be specified by the user. Configuration information may be stored in configuration registers, for example. In step 634, the host processor 104 may execute configuration commands associated with its own security tasks. In step 620, the host processor 104 may execute commands associated with additional security tasks.

Returning to step 614, after bringing up the host processor 104 from reset, the security processor 102 may wait for configuration commands from the host processor 104 determined in step 632. In this regard, the security processor 102 may program a secure register in the host processor 104 to bring it out of reset. In step 618, the security processor 102 may receive reconfiguration commands from the host processor 104. These reconfiguration commands may be encrypted and digitally signed and may be stored in non-volatile memory (NVM), such as flash memory. In some instances, reconfiguration commands may be sent from a server, for example. The security processor 102 may reconfigure portions of the secure registers in the processing units, I/O modules, and/or memory controllers based on the received commands.

The security processor 102 may also operate in a mode where it may accept interrupts or other signals from processing units, I/O modules, and/or memory controllers to reconfigure at least a portion of the secure registers of these functional blocks. For example, for the descrambling block 300 in FIG. 3, the host processor 104 may set the configuration information in the configuration register 304, which may result in an interrupt signal to the security processor 102 to verify an access control table or matrix specified by the user and then set the contents in the secure register 306 to control the key loading and data routing path. The U.S. application Ser. No. 11/136027, filed on May 23, 2005, discloses a method and apparatus for constructing access-control matrix for a set-top box security processor, and is hereby incorporated herein by reference in its entirety. Moreover, the U.S. application Ser. No. 11/136175, filed on May 23, 2005, discloses a method and apparatus for security policy and enforcing mechanism for a set-top box security processor, and is hereby incorporated herein by reference in its entirety.

In step 622, the security processor 102 may define whether other signature verification processes are necessary and may proceed to step 616 where signature verification tasks are performed. The signature verification tasks in step 616 may also occur after the host processor 104 is brought out of reset in step 614. In step 624, the security processor 102 may verify the verification steps in step 616. When the signatures pass verification, the process may proceed to step 626. In step 626, processing units and/or the host processor 104 may execute the verified code. When the signatures do not pass verification in step 624, the process may proceed to step 628 where the processing units and/or the host processor 104 may not execute the code or may be reset. The security processor 102 may continuously verify the digital signatures associated with software or code to be executed by the host processor 104 and/or the processing units to ensure that attackers may not temper the codes.

Returning to step 620, the security processor 102 may also execute commands associated with additional security tasks after the host processor 104 has been brought out of reset. In this regard, the security processor 102 may receive additional security commands based on the host processor 104 operations in step 634. Results and status information from step 620 may be communicated back to step 634 for use by the host processor 104.

In some instances, when a breach or an attempt of a breach is detected by, for example, the security processor 102, at least a portion of the SOC 100 may be reset. For example, when the security processor 102 detects a breach or an attempt of a breach, the security processor 102 may generate at least one signal that may be utilized to reset the host processor 104, the processing units, the I/O modules, and/or the memory controllers.

Figure 7:
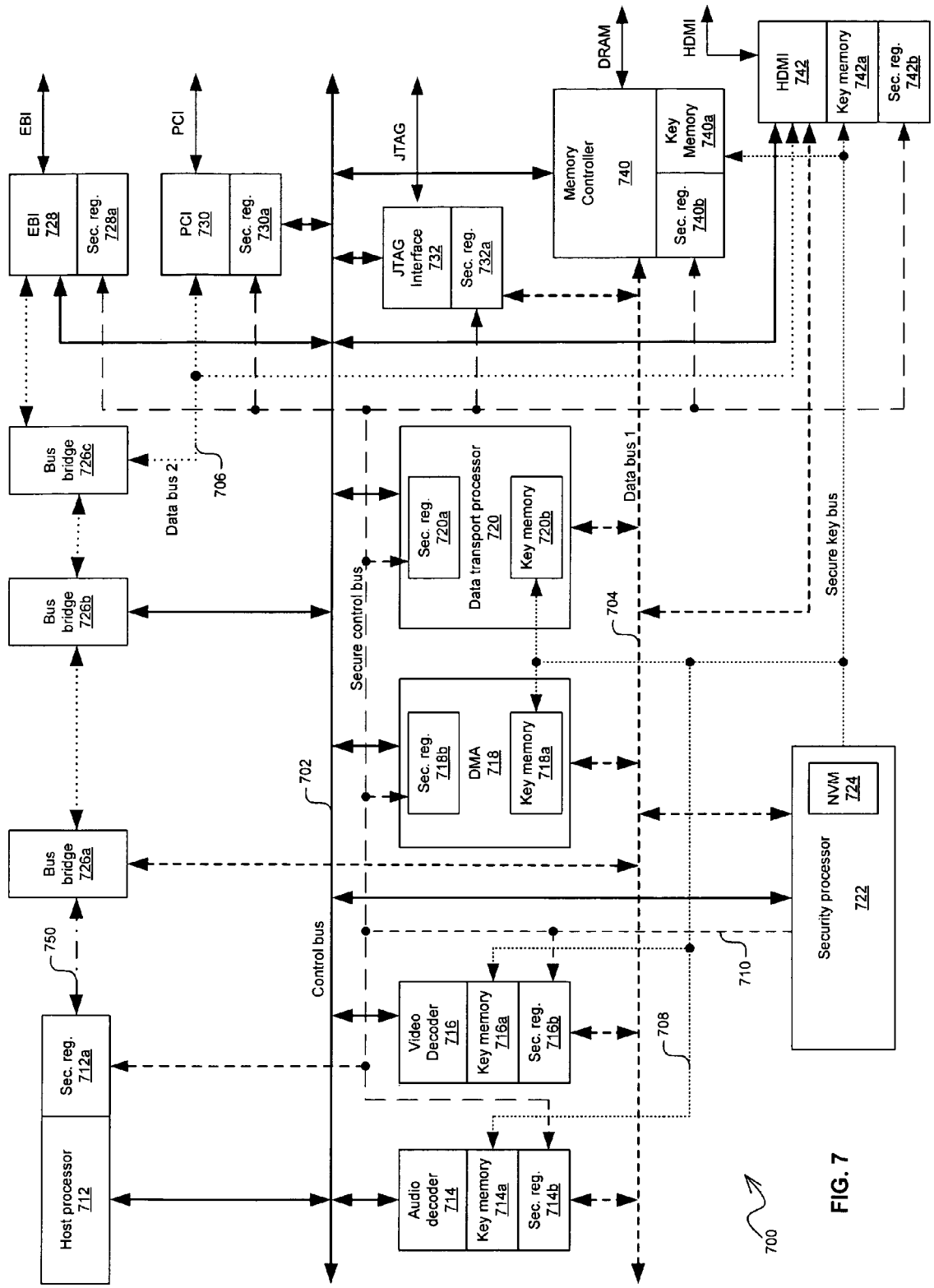
FIG. 7 is a block diagram illustrating an exemplary video and audio decompression SOC, in accordance with an embodiment of the invention.

FIG. 7 is a block diagram illustrating an exemplary video and audio decompression SOC, in accordance with an embodiment of the invention. Referring to FIG. 7, there is shown a multimedia processing SOC 700 that may comprise a host processor 712, a security processor 722, a memory controller 740, an audio decoder 714, a video decoder 716, a DMA 718, a data transport processor 720, an expansion bus interface (EBI) 728, a peripheral control interface (PCI) 730, a JTAG interface 732, and an HDMI 742.

The host processor 712 and the security processor 722 may correspond to the host processor 104 and the security processor 102 described in FIG. 1, respectively. The host processor 712 may comprise a secure register 712a that may be utilized to configure security functionalities in the host processor 712. The security processor 722 may comprise a non-volatile memory (NVM) 724 that may correspond to the NVM 522 described in FIG. 5. The NVM 722 may be utilized for configuring the operation mode of the multimedia processing SOC 700, for storing secret keys, for managing and protecting keys for data scrambling/descrambling engines, and for enabling and/or disabling security functions, for example. The security processor 722 may also comprise a mechanism for verifying memory data signatures using cryptographic algorithms to ensure the integrity of software running on host processor 712. The security processor 722 may utilize an authentication process for challenge-response or password mechanisms for activating various buses and port interfaces, such as PCI 730 and EBI 728.

The audio decoder 714 may comprise suitable logic, circuitry, and/or code that may enable decoding audio information. The video decoder 716 may comprise suitable logic, circuitry, and/or code that may enable decoding video and/or still image information. At least one stream copy-protection descrambler may be present in the audio decoder 714 and video decoder video 716 that may decrypt the streams received from a source, such as memory and/or I/O interfaces, for example. The intermediate results of the video and audio decoders, which may be stored externally to the multimedia processing SOC 700, may be scrambled and descrambled via context specific ciphers. After video and audio contents are decompressed, a content scrambler may encrypt the uncompressed data before sending them to other processing units and/or I/O interfaces. The security processor 722, may control configuration and key loading for scramblers and/or descramblers via the secure control bus 710 and the secure key bus 708.

The DMA 718 may comprise suitable logic, circuitry, and/or code that may enable a DMA engine with scramblers and descramblers for recording and playback, DVD burning and playback, and compressed content protection over interfaces, for example. The data transport processor 720 may comprise suitable logic, circuitry, and/or code that may enable network descramblers for removing network encryption on incoming transport streams. Moreover, the data transport processor 720 may comprise at least one stream copy-protection scrambler that may encrypt the streams before sending them to a destination, such as memory and/or I/O interfaces, for example. The security processor 722, via the secure control bus 710 and the secure key bus 708, may control configuration and key loading for scramblers and/or descramblers. The HDMI 742 may comprise suitable logic, circuitry, and/or code that may enable an HDCP engine and a key protection mechanism for high-bandwidth secure interfaces to digital displays, such as DVI and HDMI, for example. The memory controller 740 may comprise a DRAM scrambler and descrambler for external memory data protection.

The audio decoder 714, the video decoder 716, the DMA 718, and the data transport processor 720 may correspond to processing units 110 as described in FIG. 1. The audio decoder 714 may comprise a key memory 714a and a secure register 714b. The video decoder 716 may comprise a key memory 716a and a secure register 716b. The DMA 718 may comprise a key memory 718a and a secure register 718b. The data transport processor 720 may comprise a key memory 720b and a secure register 720a. The key memories 714a, 716a, 718a, and 720b may correspond to the key memory 204 described in FIG. 2A for processing units. The secure registers 714b, 716b, 718b, and 720a may correspond to the secure register 202 in FIG. 2A for processing units.

The memory controller 740 may correspond to the memory controller 106 as described in FIG. 1. The memory controller 724 may comprise a key memory 740a and a secure register 740. The EBI 728, the PCI 730, the JTAG interface 732, and the HDMI 742 may correspond to I/O modules 108 as described in FIG. 1. The EBI 728 may comprise a secure register 728a, the PCI 730 may comprise a secure register 730a, the JTAG interface may comprise a secure register 732a, and the HDMI may comprise a key memory 742a and a secure register 742b. The key memories 740a and 742a may correspond to the key memory 224 described in FIG. 2B for I/O modules and memory controllers. The secure registers 728a, 730a, 732a, 740b, and 742b may correspond to the secure register 222 in FIG. 2B for I/O modules and memory controllers.

The multimedia processing SOC 700 may also comprise a plurality of buses. For example, the multimedia processing SOC 700 may comprise a secure key bus 708, a secure control bus 710, a control bus 702, a data bus 1 704, a data bus 2 706, and a data bus 750. The plurality of buses may communicate via a plurality of bus bridges, such as the bus bridges 726a, 726b, and 726c. For example, the data bus 750 and the data bus 2 706 may communicate via the bus bridge 726a. The control bus 702 and the data bus 2 706 may communicate via the bus bridge 726b, for example. The portion of the data bus 2 706 that communicates with the EBI 728 may communicate with the remaining portion of the data bus 2 706 via the bus bridge 726c, for example.

In operation, the security processor 722 may verify code to be executed by the host processor 712 and may bring the host processor 712 out of reset by programming at least a portion of the secure register 712a. The components of the multimedia processing SOC 700 may each have a default configuration. For example, a vendor may determine the default configuration. The host processor 712 may perform the default configuration via the control bus 702. The host processor 712 may extract security configuration commands that may be sent to the security processor 722 and that may be utilized to execute security tasks within the host processor 712. The security processor 722 may provide reconfiguration controls to the secure registers via the secure control bus 708. Moreover, the security processor 722 may program or load the appropriate keys in the key memories via the secure key bus 708 in accordance with allowed or enabled key loading paths as specified by a user. When all security reconfigurations operations are complete, the multimedia processing SOC 700 may start data processing operations. In this regard, data may be communicated within the multimedia processing SOC 700 via the plurality of data buses.

In the exemplary embodiment described in FIG. 7, the security processor 722 may control and coordinate all of the multimedia processing SOC 700 security activities. In addition, to implementing the non-trivial parts of cryptographic algorithms as hardware accelerators for key generation and authentication, the security processor 722 may run a real-time operating system to perform various security functions. In this regard, the secure key bus 708 may provide a secure key delivery mechanism and the secure control bus 710 may provide configuration and control of security operations in components of the multimedia processing SOC 700 via the secure registers.

In an exemplary application of the multimedia processing SOC 700, an MPEG-2 transport stream carrying scrambled audio-video programs may be directly received from a transport interface and may be sent to the data transport processor 720. The key information carried by the transport packets may be extracted and processed by the security processor 722. The descrambling keys may then loaded into a content descrambler key table. The transport stream may then be descrambled and sent to audio and video decompression engines in the audio decoder 714 and video decoder 716 respectively. A DRAM scrambler in the memory controller 740 may scramble audio and video data processing, for example. Scrambled data may be written to and read from external memory, such as SDRAM, via the data bus 1 704. A DRAM descrambler in the memory controller 740 may descramble the scrambled data read from external memory. A HDMI 742 may output HDCP protected, that is, decompressed, audio and video sequences directly from the multimedia processing SOC 700 to drive a digital television, for example.

In another exemplary application of the multimedia processing SOC 700, when the multimedia processing SOC 700 operates in a PCI or EBI client mode, the PCI 730 or the EBI 728 may allow an external processor to be a master of the multimedia processing SOC 700 to control multimedia processing. The JTAG interface 732 may be a debug access port that allows a debugger on a host system to access and control state of the multimedia processing SOC 700 in a target system. For security reasons, the enabling of JTAG interface 732, the PCI 730, and/or the EBI 732 may be programmed to require authentication, for example. The security processor 722 may process the authentication. In addition, the multimedia processing SOC 700 may also verify digitally signed instruction regions in external memory, such as SDRAM and flash memory, for example.

The system architecture described herein may enable control and management mechanisms for implementing security operations in a manner that overcomes scalability limitations while providing an appropriate security level that may result in more versatile and secure multimedia systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for enabling a multimedia routing path in a single-chip integrated system, the method comprising:
   configuring, by a processor within the single-chip integrated system, a subsystem of a plurality of subsystems in the single-chip integrated system by writing to a configuration register via an unsecured bus to select an input source and an output destination for the subsystem;
   validating the selected input source and the selected output destination for the subsystem by writing to a security register by a security processor within the single-chip integrated system via a secure bus that is different from the unsecure bus; and
   writing to the security register to indicate whether the processor or the security processor is allowed to load descrambling keys into a key memory,
   wherein the subsystem of the plurality of subsystems is a descrambling block.

2. The method according to claim 1, wherein a second subsystem of the plurality of subsystems comprises:
   a multimedia processing unit.

3. The method according to claim 1, wherein a second subsystem of the plurality of subsystems comprises:
   an input and output module.

4. The method according to claim 1, wherein a second subsystem of the plurality of subsystems comprises:
   a memory controller.

5. The method according to claim 1, wherein writing to the security register comprises:
   writing a bit in the security register.

6. The method according to claim 1, further comprising:
   validating code to be executed by the processor by the security processor.

7. The method according to claim 6, further comprising:
   enabling the processor to configure the subsystem after validating the code.

8. A non-transitory machine-readable storage having stored thereon, a computer program having a code section for enabling a multimedia routing path in a single-chip integrated system, the code section being executable by a machine for causing the machine to:
   configure by a processor within the single-chip integrated system, a subsystem of a plurality of subsystems in the single-chip integrated system by writing to a configuration register via an unsecured bus to select an input source and an output destination for the subsystem;
   validate the selected input source and the selected output destination for the subsystem by writing to a security register by a security processor within the single-chip integrated system via a secure bus that is different from the unsecured bus; and write to the secure register to indicate whether the processor or the security processor is allowed to load descrambling keys into the key memory, wherein the subsystem comprises a descrambling block.

9. The non-transitory machine-readable storage according to claim 8, wherein a second subsystem of the plurality of subsystems comprises:

a multimedia processing unit.

10. The non-transitory machine-readable storage according to claim 8, wherein a second subsystem of the plurality of subsystems comprises:

an input and output module.

11. The non-transitory machine-readable storage according to claim 8, wherein a second subsystem of the plurality of subsystems comprises:

a memory controller.

12. The non-transitory machine-readable storage according to claim 8, wherein the writing to the security register comprises:

writing a bit in the security register.

13. The non-transitory machine-readable storage according to claim 8, wherein the code section further comprises code for validating code to be executed by the processor by the security processor.

14. The non-transitory machine-readable storage according to claim 13, wherein the code section further comprises code to enable the processor to configure the subsystem after the security processor has validated the code.

15. A single-chip integrated system for enabling a multimedia routing path, the system comprising:

a processor configured to configure a subsystem of a plurality of subsystems within the single-chip integrated system by writing to a configuration register via an unsecured bus to select an input source and an output destination for the subsystem;

a key memory; and a security processor configured to validate the selected input source and the selected output destination for the subsystem by writing to a security register within the single-chip integrated system via a secure bus that is different from the unsecured bus and to write to the secure register to indicate whether the processor or the security processor is allowed to load descrambling keys into the key memory, wherein the subsystem comprises a descrambling block.

16. The system according to claim 15, wherein a second subsystem of the plurality of subsystems comprises:

a multimedia processing unit.

17. The system according to claim 15, wherein a second subsystem of the plurality of subsystems comprises:

an input and output module.

18. The system according to claim 15, wherein a second subsystem of the plurality of subsystems comprises:

a memory controller.

19. The system according to claim 15, wherein the security processor is configured to validate the selected input source and the selected output destination by writing a bit in the security register.

20. The system according to claim 15, wherein the security processor is further configured to validate code to be executed by the processor.

21. The system according to claim 20, wherein the processor is configured to enable configuration of the subsystem after the security processor has validated the code.

* * * * *